United States Patent [19]

Cipelletti

[11] Patent Number: 4,706,473
[45] Date of Patent: Nov. 17, 1987

[54] ESPRESSO ICE-CREAM MACHINE

[75] Inventor: Alberto Cipelletti, San Fiorano, Italy

[73] Assignee: Ditta Cipelletti Alberto, Italy

[21] Appl. No.: 17,269

[22] Filed: Feb. 20, 1987

[30] Foreign Application Priority Data

Feb. 21, 1986 [IT] Italy ............................... 19501 A/86

[51] Int. Cl.[4] .............................................. A23G 9/16
[52] U.S. Cl. ........................ 62/342; 62/324.3
[58] Field of Search ............ 62/342, 81, 238.7, 324.3; 165/62

[56] References Cited

U.S. PATENT DOCUMENTS

| | | | |
|---|---|---|---|
| 3,196,627 | 7/1965 | Swenson | 62/342 X |
| 3,626,707 | 12/1971 | Bauknecht et al. | 62/81 |
| 3,811,494 | 5/1974 | Menzel | 62/342 X |
| 3,930,535 | 1/1976 | Menzel | 62/342 X |
| 4,380,156 | 4/1983 | Ecker | 62/238.7 X |
| 4,476,146 | 10/1984 | Manfroni | 62/342 X |
| 4,522,041 | 6/1985 | Menzel | 62/342 |

Primary Examiner—William E. Tapolcai

Attorney, Agent, or Firm—Lerner, David, Littenberg, Krumholz & Mentlik

[57] ABSTRACT

The invention concerns a machine for making espresso ice-cream, of the type comprising a pressurized gas refrigerating circuit composed of a compressor, a condenser, one or more lamination valves as well as heat-exchanger coils in thermal exchange relationship with the mixture storage vat and the mixing and whipping cylinder and characterized in that the refrigerating circuit further comprises an evaporator as well as a system of valves and tubes to interconnect, alternatively and selectively, the components of the circuit, the evaporator and the coils in one of the following sequences:

(a) compressor, coils, condenser, lamination valve(s), evaporator, compressor;

(b) compressor, condenser, lamination valve(s), coils, evaporator, compressor, respectively for heating and cooling the contents of the mixture storage vat and the mixing and whipping cylinder.

4 Claims, 2 Drawing Figures

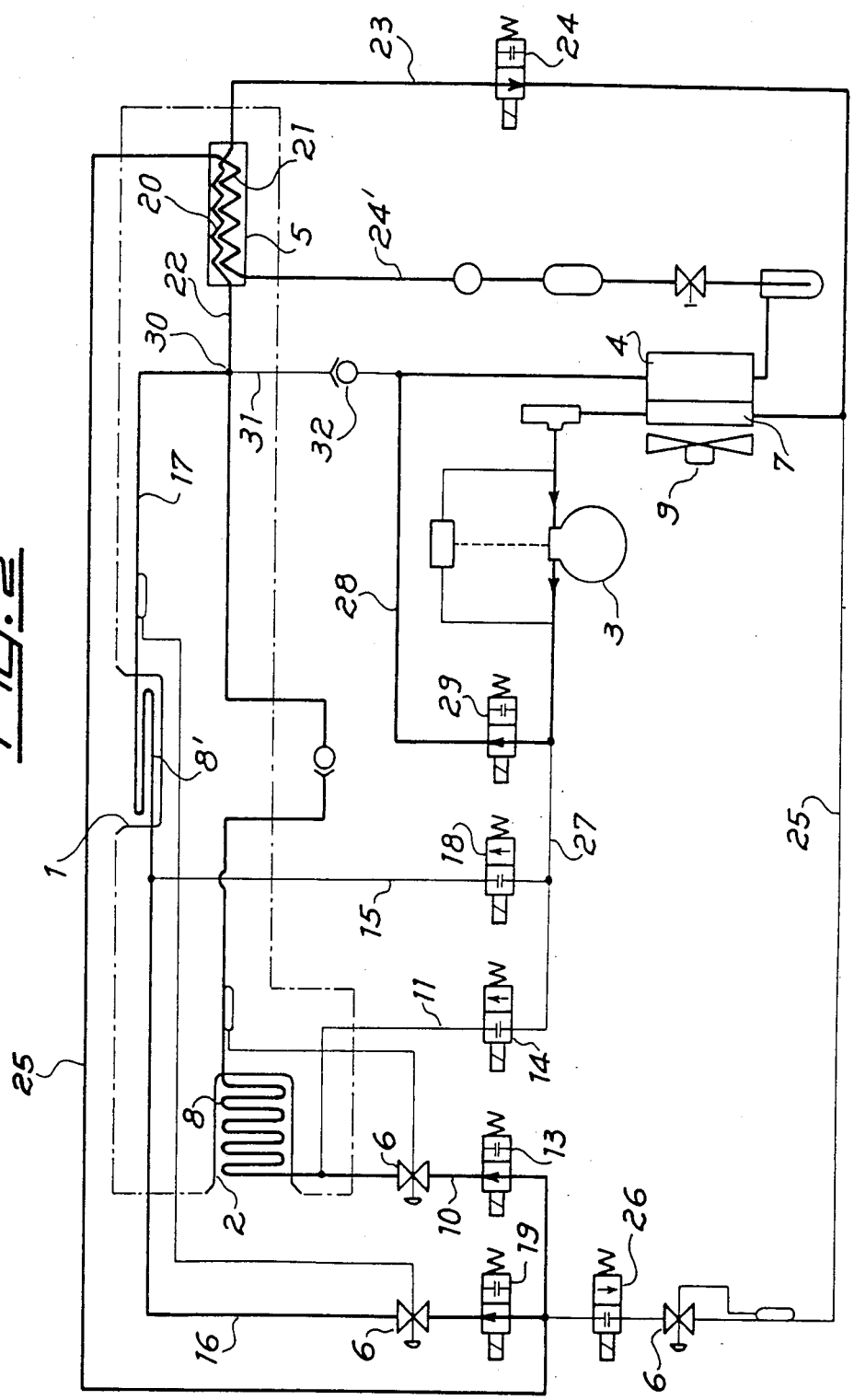

ESPRESSO ICE-CREAM MACHINE

BACKGROUND OF THE INVENTION

1. Field of the Invention

The present invention concerns a machine for the production of ice-cream, of the type comprising a pressurized gas refrigeration circuit.

2. Description of the Prior Art

Machines are known for the production of espresso ice-cream, consisting of a vat for the storage of the mixture to be frozen in liquid form, a mixing and whipping cylinder for said mixture and a manually-operated tap through which the mixture is dispensed.

More precisely, the mixture is fed either by gravity or pump from the storage vat to the mixing and whipping cylinder where it undergoes a further refrigeration and is mixed and forced through the tap-dispenser by a mixer-web.

Both the storage vat and the mixing and whipping cylinder are cooled by coils connected to the refrigeration circuit and in intimate thermal exchange relationship with the exterior surfaces of the same vat and cylinder.

At predetermined times the mixture in the vat and cylinder must be pasteurized to prevent the deterioration of the mixture through the build-up of bacteria. To achieve this, the vat and cylinder must be heated and maintained for a predetermined time at a temperature sufficiently high to kill germs.

This has been achieved in espresso ice-cream machines known up to now, by having both the vat and the mixing and whipping cylinder in thermal exchange relationship with electrical resistance heaters which supply the heat necessary to raise and maintain the temperature at a level sufficiently high to destroy germs.

Such electrical resistance heaters, besides complicating the construction of the machine, use significant quantities of electricity, which raises the operating costs of the machine considerably.

OBJECTS OF THE INVENTION

An object of this invention is to provide a machine for making espresso ice-cream, in which the heat necessary for heating the mixture in both the vat and the mixing and whipping cylinder is supplied, at least in part, by the pressurization work of the refrigeration gas.

SUMMARY OF THE INVENTION

This object is achieved by a machine for making espresso ice-cream, of the type comprising a pressurized gas refrigerating circuit composed of a compressor, a condenser, one or more lamination valves as well as heat-exchanger coils in relationship with the mixture storage vat and mixing and whipping cylinder and is characterized in that the refrigeration circuit further comprises an evaporator as well as a system of valves and tubes to interconnect, alternatively and selectively, the components of the circuit, the evaporator and the coils in one of the following sequences:
  (a) compressor, coils, condenser, lamination valve(s), evaporator, compressor;
  (b) compressor, condenser, lamination valve(s), coils, evaporator, compressor;
respectively for heating and cooling the contents of the mixture storage vat and the mixing and whipping cylinder. The principal characteristics and advantages of a machine according to the invention shall now be described with reference to the enclosed drawings.

BRIEF DESCRIPTION OF THE DRAWINGS

FIG. 2 is a refrigeration circuit diagram showing the path taken by the refrigerant fluid during the refrigerating phase.

DESCRIPTION OF THE PREFERRED EMBODIMENT

Figure 1:
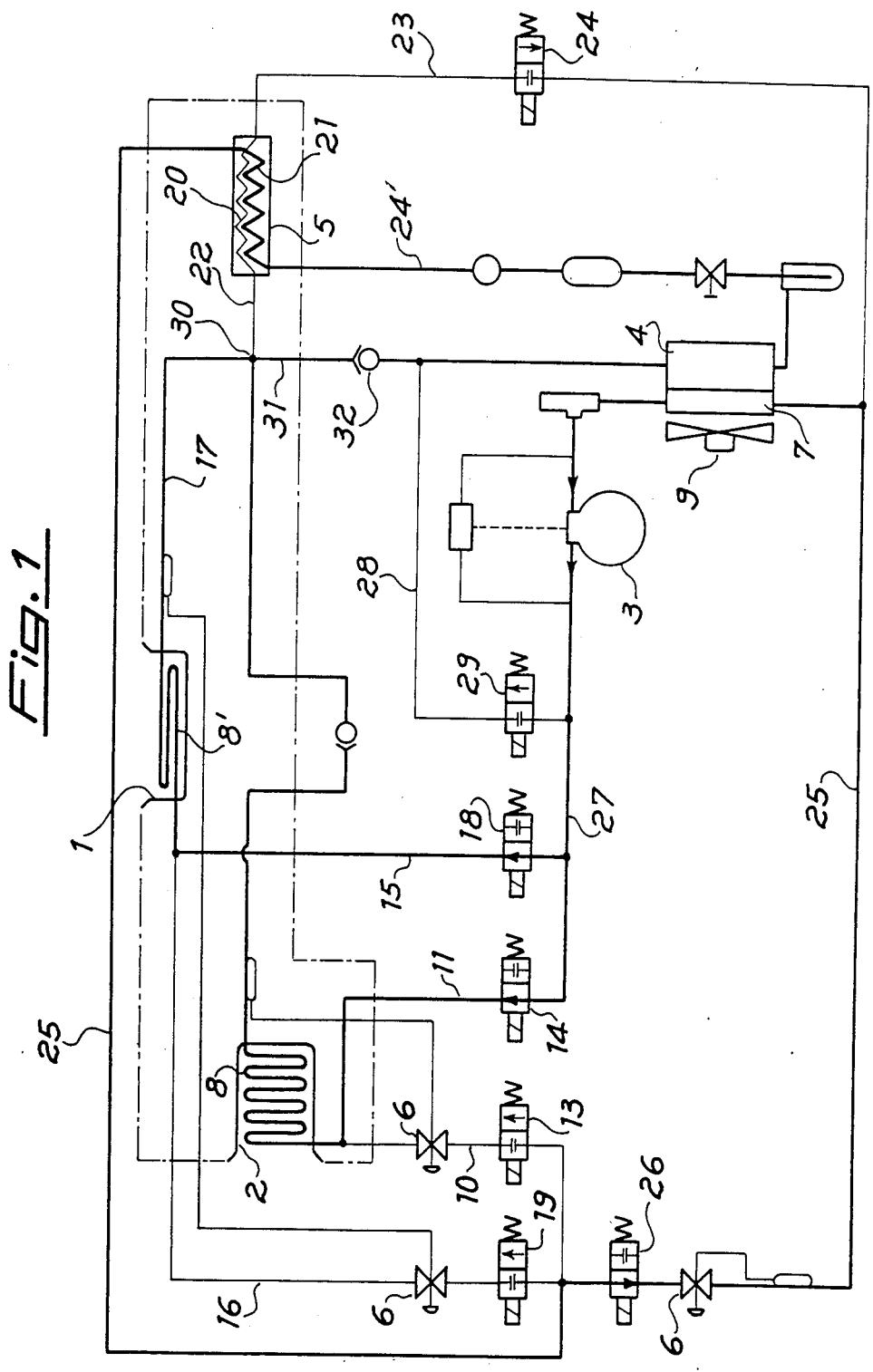
FIG. 1 is a refrigeration circuit diagram showing the path taken by the refrigerant fluid during the heating phase.

With reference to the enclosed drawings, the machine according to the invention consists essentially of a mixture storage vat 1, a mixing and whipping cylinder 2, and a pressurized gas refrigeration circuit comprised of a motor driven compressor 3, a condenser 4, a heat-exchanger 5 in thermal exchange relationship with the mixing and whipping cylinder 2, lamination valves 6 and an evaporator 7. The vat 1 and the mixing and whipping cylinder 2 are in thermal exchange relationship with the coils 8 and 8'; the coil 8 is connected to the refrigeration circuit by tubes 10, 11 and 12, while coil 8' is connected to the refrigeration circuit by tubes 15, 16 and 17. The tubes 10 and 11 are controlled by electro-valves 13 and 14, while tubes 15 and 16 are controlled by electro-valves 18 and 19.

The evaporator 7 and the condenser 4 are air heat exchangers positioned in mutual heat exchange and are cooled by an air flow from a fan 9.

The heat exchanger 5 is in its turn in thermal exchange relationship with two coils 20 and 21; the coil 20 is connected to the refrigeration circuit by the tubes 22 and 23, the latter controlled by an electro-valve 24, while the coil 21 is connected to the refrigeration circuit by the tubes 24' and 25, the latter controlled by an electro-valve 26.

The refrigeration circuit also includes a tube 27 connected to the outlet of a compressor 3, a tube 28 controlled by an electro-valve 29 and connecting the compressor outlet to the condenser inlet and a tube 31 which connects the tubes 12 and 17 to the condenser.

To better understand the circuit, it is useful to follow the circulation of the refrigerant fluid in the two respective phases: the heating and cooling of the storage vat 1 and the mixing and whipping cylinder 2.

Considering first the cooling phase of the mixture in the storage vat 1 and the cylinder 2 and referring to FIG. 2, valves 18, 14 and 26 are in the closed position while valves 29,13 and 19 are in the open position.

The refrigerant gas leaves the compressor 3 at high temperature and high pressure, passes through the valve 29 and enters the tube 28; from there it is unable to pass the non-return valve 32 and goes on to to the condenser 4 where it is cooled and condensed.

The liquid leaving the condenser 4 goes to a collection tank from which it is taken by tube 24' to the coil 21 in thermal exchange relationship with the heat exchanger 5. In the heat exchanger 5 the refrigerant is cooled because, as will be seen later, the heat exchanger 5 is in thermal exchange relationship with the coil 20 in which cool refrigerant is passing.

From the coil 21 the refrigerant passes through tube 25 and the electro-valves 19 and 13 to the lamination valve 6 where it expands and cools. The expanded and cooled gas passes from lamination valve 6 to the coils 8 and 8' in thermal contact with the mixing and whipping cylinder 2 and the storage vat 1 respectively, where it cools the contents of both the vat and cylinder. Leaving the coils 8 and 8', the refrigerant enters tubes 12 and 17 but cannot pass to tube 31, because the non-return valve 32 is closed by the high-pressure gas on the other valve side and so it passes through tube 22 to the coil 20 in thermal exchange relationship with the heat exchanger 5. The refrigerant leaves coil 20 by tube 23, passes through valve 24, and is sent ot the evaporator 7 where it is completely vapourized and, completely expanded and completely devoid of droplets of liquid, it passes into the intake of the compressor.

FIG. 1 shows the circuit of the refrigerant during the heating phase of the mixture in the storage vat 1 and the mixing and whipping cylinder 2.

In this case the electro-valves 24, 26, 19, 13 and 29 are in the closed position while valves 18 and 14 are in the open position.

The refrigerant fluid leaves the compressor 3 through the tube 27, passes the electro-valves 18 and 14 and enters coil 8 in thermal exchange relationship with the mixing and whipping cylinder 2 and coil 8' in thermal exchange relationship with the storage vat 1 respectively. In this way the high temperature refrigerant fluid heats the contents of the vat 1 and the cylinder 2. Leaving the coils 8 and 8', the refrigerant passes through tubes 12 and 17 to 30 where it is reunited and enters tube 31. It should be noted that the refrigerant is unable to enter tube 22 because the valve 24 is closed. From tube 32 the refrigerant fluid passes through tube 31 and goes on to the condenser 4 where it gives up its residual heat and is completely condensed.

The liquid leaving the condenser 4 goes to a collection tank from which it is taken by tube 24' to coil 21 in thermal exchange relationship with the heat exchanger 5. In the heat exchanger 5 the refrigerant is further cooled. From the coil 21 the refrigerant passes through tube 25 and the electro-valve 26 to the lamination valve 6 where it expands and cools. The expanded and cooled gas passes through the tube 25 to the evaporator 7 where it is completely vapourized taking heat from the current of air produced by the fan 9. From there, completely expanded and completely devoid of droplets of liquid, said refrigerating gas passes into the intake of the compressor 3.

The refrigeration circuit according to the invention can operate, alternatively and selectively, depending on whether the electro-valves are open or closed, as a refrigerator or as a heat pump, respectively for cooling or heating the contents of the storage vat 1 and the mixing and whipping cylinder 2.

The principal advantage of the refrigeration circuit according to the invention is that the refrigerant makes a complete cycle in both the heating and refrigeration phases. In this way cool refrigerant free of liquid droplets is circulated to the compressor in both phases.

I claim:

1. A machine for making espresso ice-cream, of the the type comprising a pressurized gas refrigerating circuit composed of a compressor, a condenser, one or more lamination valves as well as coils in thermal exchange relationship with a mixture storage vat and a mixing and whipping cylinder, characterized in that the said refrigeration circuit further comprises an evaporator as well as tubes and valves to connect, alternatively and selectively, the components of the circuit itself, the evaporator and the coils in one of the following orders:

(a) compressor, coils, condenser, lamination valve(s), evaporator, compressor;
   (b) compressor, condenser, lamination valve(s), coils, evaporator, compressor;

respectively for heating and cooling the contents of the mixture storage vat and the mixing and whipping cylinder.

2. A machine according to claim 1, characterized in that said evaporator and condenser are formed by two air heat exchangers located in mutual heat exchange relationship.

3. A machine according to claim 1, characterized in that said condenser is formed by two heat exchangers in series with respect to the direction of circulation of the refrigerant fluid, the first being a water heat exchanger and the second an air heat exchanger.

4. A machine according to claim 3, characterized in that said evaporator is an air-cooled heat exchanger in thermal exchange relationship with the second condenser.

* * * * *